Patented Dec. 26, 1939

2,184,318

UNITED STATES PATENT OFFICE 2,184,318

PROCESS FOR SIMULTANEOUS PRODUCTION OF ALUMINA CEMENT AND PIG IRON IN BLAST FURNACES

Stevan Ruzicka, New York, N. Y.

No Drawing. Application March 19, 1937, Serial No. 131,932. In Germany November 15, 1934

4 Claims. (Cl. 75—30)

The object of the invention is to produce alumina cement and iron, both of high grade, in the blast furnace, by the use of bauxite and an artificial charcoal, wherein the favorable effects of the employment of bauxite without its known disadvantages, are utilized, and wherein the end products are free from deleterious substances resulting from the use of ordinary blast furnace coke.

For this purpose, my invention consists of the method of making a high grade alumina cement and a high grade pig iron by melting down a charge of a mixture of ores and fluxes containing bauxite, in the presence of an artificial carbon as will be hereinafter described, and further, in the use of blast air acting upon such charge, either pre-heated or cold, according to requirements, which air has been enriched with oxygen.

The invention will be hereinafter further described, and finally pointed out in the claims.

By artificial charcoal is meant a product obtained by the destructive distillation at the high temperatures of 500° C. to 1200° C. in a coking oven retort, of a mixture of pulverized charcoal and a cokable binder, intimately, thoroughly and homogeneously mixed. This product is of substantially uniform physical and chemical homogeneity, and has the advantages of porosity of charcoal, without its attendant friability and without the presence of foreign substances which remain from carbonization at the low temperatures at which charcoal is made from wood, sawdust, etc. Chemically considered, this artificial charcoal is almost pure carbon, and is of great tenacity and hardness, and has a friability of less than 5%. This product, either in briquette form, or in irregular shape such as results from breaking a coking oven retort charge after coking, is then added to the aforesaid charge.

Bauxite is a mineral much richer in alumina than the clays or marls usually used for the production of cement, bauxite itself being too valuable to be used alone for the production of alumina cement. But even in those cases wherein endeavors were made to use bauxite, it was found that the product obtained was not satisfactory, since it contained end products resulting from the use of coke ash, which have an unfavorable effect upon the slags to be converted into alumina cement in regards to their composition. When blast furnace cokes were used they were such in which the ratio of silicic acid to alumina in the ash corresponded to that of clay, which is not favorable for the production of high grade iron or slag for high grade alumina cement. The employment of bauxite on the other hand, yielded a rather refractory slag, which caused difficulties in the separation of the iron. When bauxite and limestone were used, to serve as raw material for the fused mass, these lacked elements which promote the fluidity of the charge; and when raw materials containing manganese or phosphorus were added to give a better flux, the purity of the iron was detrimentally affected. Special compositions of pig iron had their limited uses. Special solutions of the problem by the use of special mixtures of materials, but nevertheless having varying compositions of the ash resulting from the coke used, rendered such special solutions of little avail in the general manufacture of refined pig iron.

All of these disadvantages are overcome by adding to the charge of a blast furnace, suitable quantities of bauxite and artificial charcoal, as described, and subjecting the charge to a blast of air, pre-heated or cold, previously enriched with oxygen. The charge of the blast furnace is composed of the iron; either iron ore, or scrap iron or both; as is usual in the blast furnace reduction of iron, mixed with the artificial charcoal and bauxite.

The amount of bauxite in the charge depends mainly upon the silica content of the bauxite used and upon the silica content of the iron ore used. If scrap iron is part of the charge to be reduced, which scrap iron seldom contains silica, or in very small percentage, more bauxite is added to the charge. In such a case more alumina cement is produced than when only iron ore is used in the charge.

The amount of bauxite added is determined by the maximum limit of slag which is fifty per cent of the amount of the produced pig iron. The amount of bauxite in any case depends upon the chemical constituents of the bauxite and iron ore, which in each is determinable by means of calculations generally employed in blast furnace operations. The enriching oxygen is supplied by special means such as for example, an air liquefying plant, so that the blast contains most advantageously air having an oxygen content of 30 to 40%. The ordinary air blast contains about 20 per cent. The increased oxygen provides a saving of the artificial charcoal needed as fuel, and gives the possibility of a quicker reduction of the iron oxides in the charge. Thereby the use of bauxite, rich in alumina, avoids the need of the use of the cheaper clays and marls with their attendant impurities. As all deleterious end products have been removed or destroyed by the destructive distillation at temperatures of between 500° C. and 1200° C. of the mixture of charcoal and cokable binder, the artificial charcoal described renders to the charge all the advantages of charcoal without the disadvantages thereof or the objectionable disadvantages of the coke. This artificial charcoal is highly porous, and absorbs air as stated. By deleterious end products is meant those impurities which are found in bituminous, metallurgical coke. These are not present in my artificial charcoal. The high temperatures used in the production of artificial charcoal bring about the removal of the volatiles to the utmost limit, resulting in a hard wood-coke.

Accordingly, there is produced a pure, that is, a refined pig iron, which is similar to charcoal iron, and also there is produced a high grade of slag for the production of bauxite cement, without detrimental ash content, or other detrimental constituents which may have originated from the ash resulting from the coke or charcoal.

Only through the enrichment of the blast by the added oxygen one obtains a quicker and more uniform melting and reduction of the charge, and one saves considerably in the amount of reduction material.

The greatest part of the iron contained in the bauxite will be at the same time reduced to pig iron. Instead of iron ore, one can advantageously utilize iron scrap. In the art of blast furnace operations, it is known that iron ore and iron scrap are reduced in the charge containing reducing agents.

In place of the artificial charcoal described, another pure reducing material which has substantially the same physical and mechanical characteristic and low content of ash without detrimental constituents, such as, for example, petroleum coke produced under high coking temperature, may be used.

The proportions of bauxite, artificial charcoal or coke, air, etc., depend upon the products being treated and vary in different localities, as is well known in this art.

It is obvious that various changes and modifications may be made in the details of composition and process of the above specifically described embodiments of this invention without departing from the spirit thereof, such changes and modifications being restricted only by the scope of the following claims.

I claim:

1. The process herein described, which consists in subjecting a blast furnace charge containing iron, bauxite, a carbonaceous material selected from a class consisting of petroleum coke produced at high coking temperature and an artificial charcoal resulting from subjecting pulverized charcoal and a cokable binder to the action of a coking oven retort at temperatures between 500° C. and 1200° C., to a blast furnace reduction for producing molten iron and alumina cement.

2. The process herein described, which consists in subjecting a blast furnace charge containing iron, bauxite, a carbonaceous material selected from a class consisting of petroleum coke produced at high coking temperature and an artificial charcoal resulting from subjecting pulverized charcoal and a cokable binder to the action of a coking oven retort at temperatures between 500° C. and 1200° C., to a blast furnace reduction for producing molten iron and alumina cement, and during said reduction supplying said charge with a blast of air enriched by oxygen.

3. The process for simultaneous production of alumina cement and high grade pig iron in blast furnaces, which consists in subjecting a charge containing a ferrous material, bauxite and an artificial charcoal resulting from subjecting pulverized charcoal and a cokable binder to the action of a coking oven retort at temperatures between 500° C. and 1200° C. to a blast furnace reduction for producing a molten ferrous material and alumina cement, and melting down the charge in the blast furnace.

4. The process herein described, which consists in subjecting a blast furnace charge containing a ferrous material, bauxite and an artificial charcoal resulting from subjecting pulverized charcoal and a cokable binder to the action of a coking oven retort at temperatures between 500° C. and 1200° C., to a blast furnace reduction for producing a molten ferrous material and alumina cement and enriching said charge with a blast of oxygen having an oxygen content of 30 to 40 percent.

STEVAN RUZICKA.